July 12, 1966   R. F. GRADY, JR   3,260,116
REMOTE READING TEMPERATURE INDICATING SYSTEM
Filed May 15, 1963
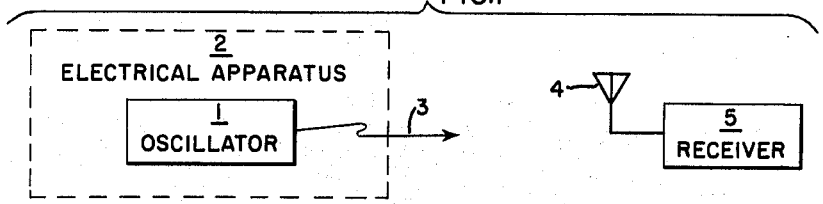
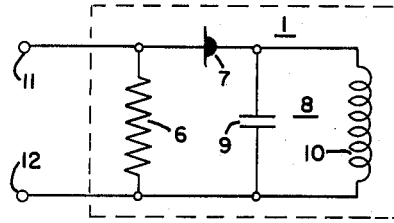
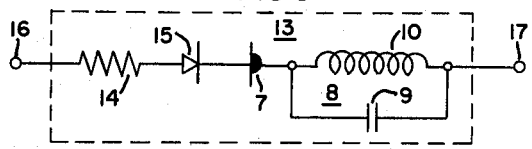
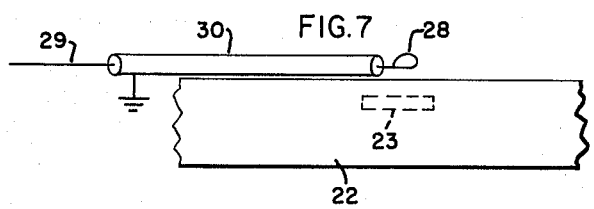
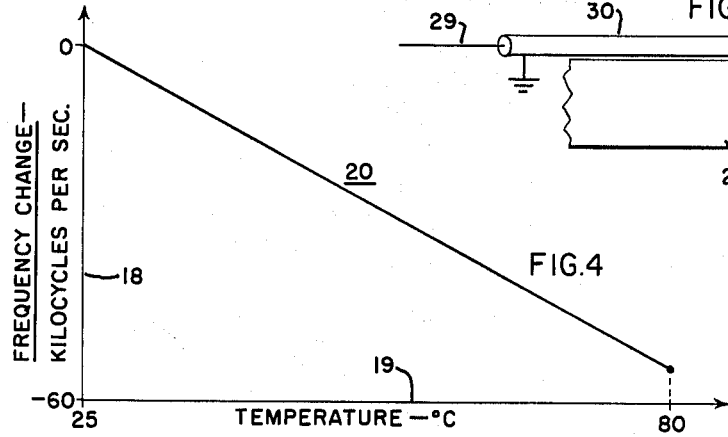
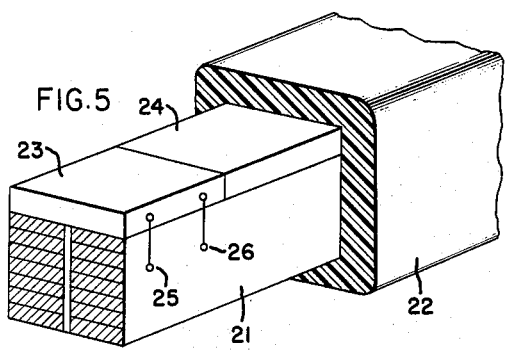
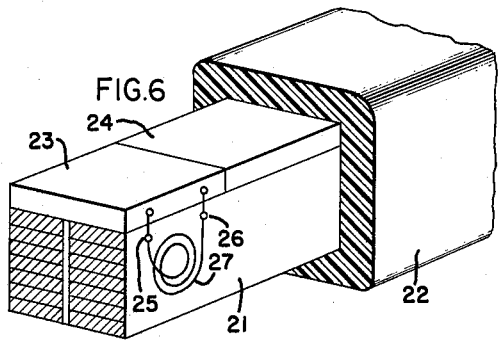
INVENTOR:
RAYMOND F. GRADY JR.,
BY  *Arthur Kiess*
HIS ATTORNEY.

United States Patent Office 3,260,116
Patented July 12, 1966

3,260,116
REMOTE READING TEMPERATURE INDICATING SYSTEM
Raymond F. Grady, Jr., Lynn, Mass., assignor to General Electric Company, a corporation of New York
Filed May 15, 1963, Ser. No. 280,664
4 Claims. (Cl. 73—362)

This invention relates to conductor temperature sensing devices for electromagnetic apparatus, and more specifically pertains to a remote reading conductor temperature indicating system for relatively large apparatus such as electrical power generators, motors and transformers, although it may be found applicable to monitoring temperatures in other heat generating devices.

It long has been recognized in the design and operation of electromagnetic apparatus that power handling capability is limited by the temperature of the conductors within the apparatus. The conductor temperature generally reaches a maximum value at one or more determinable locations, or "hot spots." This maximum conductor temperature must be known and designed for, if equipment failure and costly repairs are to be avoided. For any given electromagnetic apparatus, the temperature of the conductors and other associated parts will rise to a level high enough to provide a dissipation of heat equal to the generated heat. This requirement must be met for continuous operation of the apparatus under a given set of load conditions. If the temperature at any location along a conductor rises above a predetermined maximum design temperature, in reaching the required equilibrium state of heat transfer, permanent damage is likely to occur. For example, the insulation which normally surrounds the conductors in electromagnetic apparatus may reach a temperature where carbonization occurs, resulting in loss of insulating properties. In addition, the insulation may be adversely affected mechanically and become brittle to the extent that cracking readily occurs when the conductors undergo slight displacements or changes in dimension as a result of the normal operating stresses in the conductors. Such stresses may be caused, for example, by electrical forces or by differential thermal expansion caused by variations in conductor temperature. For purposes of weight reduction and economy in manufacture, it is frequently desirable to minimize the quantity of iron and copper used in a particular apparatus. This requires that the conductors of the electromagnetic apparatus be designed to approach the maximum temperature consistent with preserving the insulating qualities of the insulation. When the conductors operate close to the maximum permissible temperature, it is imperative that some means be provided to monitor the conductor temperature at selected "hot spots," whereby the operation of the electromagnetic apparatus may be rapidly altered in the event that an excessive conductor temperature is reached.

In the past, a variety of means have been utilized to sense indirectly the temperature of conductors in electromagnetic apparatus. For example, the temperature of the cooling medium, such as oil, hydrogen or air, may be monitored in order to provide an indication of conductor temperature. Since this method of indicating temperature is indirect, it suffers from inaccuracies in estimating the effect of a variety of parameters which affect the total temperature gradient within the apparatus. A large portion of the total temperature drop is contained in the conductor insulation. Therefore, using such methods indicates only an average temperature, which is much lower than the actual average conductor temperature, and further yields almost no information as to actual conductor maximum temperature locations or "hot spots." Also, the external media response to actual conductor temperature variation is slow because of its large thermal inertia and indirect thermal contact to the heat generating source.

Another method, used in transformers and in the stators of dynamoelectric machines, has been to employ a thermocouple, bimetal relay or other heat-sensing element placed in heat exchange relationship with a portion of a conductor. While this latter method provides direct conductor temperature measurement as contrasted to the aforementioned methods, it is necessary to puncture the conductor insulation in order to bring out the temperature sensor leads. This method not only has the major disadvantage of weakening the properties of the insulation at the point of puncture, but also presents the problem of insulating the measuring system from a conductor which may be many thousands of volts above ground potential. The temperature sensing element may be either surrounded by insulation or mounted outside the insulation of the conductor, however either expedient results in an indirect temperature measurement wherein the sensing element is at a temperature much less than that of the conductor. Also, response of the element to a change in conductor temperature is made slower.

From the foregoing discussion, it is apparent that presently known temperature indicating systems are not capable of providing a feasible direct measurement of the actual conductor temperature at precise locations. Known systems suffer from an inability to promptly indicate temperature changes of the conductor and are subject to inaccuracy as a result of indirect measurement. There is a need, particularly where automatic controls are utilized to control high-efficiency apparatus, for a system which is capable of rapidly and accurately indicating the actual conductor temperature at precise locations within the apparatus.

Accordingly, it is an object of this invention to provide an electromagnetic apparatus having an improved conductor temperature sensor which is responsive to actual conductor temperature at precise locations.

It is another object of this invention to provide an electromagnetic apparatus having an accurate conductor temperature sensor which is rapidly responsive to variations in conductor temperature at precise locations and which does not require puncturing of the insulating sheath which surrounds the conductor.

A still further object is to provide effective remote monitoring means for the determination and interpretation of the temperature sensor signal.

The invention possesses other objects and advantages which will be apparent from the following description, taken in conjunction with the drawings.

In accordance with a preferred embodiment of this invention, a miniaturized oscillator having a temperature-dependent frequency of oscillation is disposed in contact with a current-carrying conductor of the electromagnetic apparatus. This conductor may be either of the stator or rotor. The frequency-determining circuit of the oscillator includes a temperature-dependent component, preferably a capacitor, and the output frequency of the oscillator is thereby made temperature-dependent. The components are preferably secured in position adjacent and in direct contact with the conductor by an electrical insulating sheath which surrounds the conductor. Power is supplied to the oscillator, by various means, and the frequency of the output signal from the oscillator is monitored externally of the electromagnetic apparatus to provide a convenient measurement of the actual temperature of the conductor.

The invention may be best understood by reference to the following description taken in conjunction with the accompanying drawings in which:

FIGURE 1 is a block diagram of the temperature measuring system of this invention;

FIGURE 2 is a schematic diagram of an oscillator suitable for use with the present invention;

FIGURE 3 is a schematic circuit diagram of a suitable alternative oscillator;

FIGURE 4 is a graphical presentation of the temperature dependency of the frequency of the circuit of FIGURE 2;

FIGURE 5 is a cutaway view of an oscillator in position inside an electromagnetic apparatus;

FIGURE 6 is another cutaway view of an oscillator in position within an electromagnetic apparatus, showing an alternative means of powering the oscillator;

FIGURE 7 is a schematic diagram showing signal pickup means which may be used in the present invention.

FIGURE 1 shows a block diagram of the basic radio frequency signal components of the present invention. An oscillator 1 is disposed inside an electromagnetic apparatus 2, which may be a large motor or generator. The signal provided by oscillator 1 is propagated externally of electromagnetic apparatus 2, as indicated by oscillator output signal 3, which is received by antenna 4 and conducted to receiver 5, wherein the signal is amplified to a desired level of signal strength. Thus, if the oscillator is disposed to sense rotor conductor temperature, no sliprings or leads are required to the monitoring device 5.

In accordance with the present invention, oscillator 1 is disposed within electromagnetic apparatus 2 at a location where it is desired to have a temperature sensor. Electronic oscillator 1 provides a temperature-dependent output signal 3. For example, the frequency of output signal 3 may vary as a predetermined function of temperature. Receiver 5, which receives output signal 3 through antenna 4, is used to monitor the output signal 3 of oscillator 1 to provide an indication of the temperature at the location of oscillator 1. In the event that oscillator 1 provides an output signal 3 which varies in frequency with variations in temperature, receiver 5 is provided with frequency selection means whereby the frequency of output signal 3 may be determined to provide the indication of temperature.

The signal monitoring means 5 may take a variety of forms. In general, a suitable frequency selective receiving and amplification system with desired temperature readout would be employed. For example, when the frequency output signal 3 is dependent upon temperature or otherwise frequency modulated, receiver 5 may range in complexity from an FM radio receiver to a more sophisticated selective receiving and amplification system using an electronic counter for measuring output frequency or having a direct temperature readout. If the amplitude of output signal 3 is dependent on temperature or otherwise amplitude modulated, the receiver may be an AM radio or again a more suitable selective receiving and amplification system with desired temperature readout. As explained later, use of an alternating current voltage supply for oscillators of FIGURES 2, 3 results in an amplitude-modulated output.

In FIGURE 2 is shown the schematic circuit diagram of an oscillator suitable for practicing the invention. As shown, the oscillator comprises what is commonly known as a "base pi network," having a resistor 6, a tunnel diode 7, and a frequency-determining parallel resonant circuit 8, in the three respective legs of the "pi." The resonant circuit 8 includes a capacitor 9 and an inductor 10, at least one of which is so selected as to have a temperature-dependent reactance, whereby the resonant frequency of the circuit changes with variations in temperature. The power required for oscillation is supplied to oscillator 1 through terminals 11 and 12, which are connected to a suitable source of voltage, as described more specifically hereinafter.

The oscillator circuit of FIGURE 2 is adapted for use in the present invention by providing a large value of capacitance for capacitor 9 relative to the capacitance of tunnel diode 7. This results in an oscillator having an output frequency which is substantially independent of the characteristics of tunnel diode 7. Thus, variations in the voltage supplied to terminals 11 and 12 and variations in the temperature of tunnel diode 7 have a negligible effect upon the output frequency, which is then primarily dependent upon the reactances of capacitor 9 and inductor 10. This voltage stability allows use of A.C. as well as standard D.C. voltage supplies. By selecting capacitor 9 and inductor 10 so as to have predetermined variations in reactance as a function of temperature, it is possible to measure the temperature of oscillator 1 by noting the frequency of the output signal 3.

The general design and operation of tunnel diode oscillator circuits, such as that shown in FIGURE 2, is explained in more detail starting at page 33 of the "Tunnel Diode Manual," published in 1961 by the General Electric Company, assignee of the present application.

FIGURE 3 shows a schematic diagram of a circuit which is a modification of the basic oscillator circuit of FIGURE 2. This circuit is a series network employing rectification for positive bias of the tunnel diode. Specifically, FIGURE 3 shows an oscillator 13 comprising a series network including a resistor 14, diode 15, tunnel diode 7, and a frequency-determining parallel resonant circuit 8. The resistor 14 may have a low resistance, and in some cases the resistance of the leads may provide the required resistance. As in the embodiment of FIGURE 2, resonant circuit 8 includes a parallel-connected capacitor 9 and inductor 10. Power is supplied to oscillator 13 through terminals 16 and 17, which are connected to a suitable voltage source.

As with the oscillator of FIGURE 2, oscillator 13 of FIGURE 3 is designed to have an output signal frequency which is substantially independent of the voltage supplied over the operating range to terminals 16 and 17 and the characteristics of tunnel diode 7, again making A.C. in addition to standard D.C. voltage supply applicable. Diode 15 is added to oscillator 13 in order to provide positive biasing of the circuit when terminals 16 and 17 are connected to a source of alternating current voltage. Under these conditions, it is apparent that oscillator 13 will function to provide an output signal only during portions of the alternate half-cycles during which tunnel diode 7 is forward-biased. During these portions of alternate half-cycles, diode 15 is similarly forward-biased into a region of high conduction, and therefore diode 15 does not alter normal circuit operation during these intervals. However, during opposing half-cycles, when tunnel diode 7 is back-biased and the oscillator is not functioning to provide an output signal, diode 15 is back-biased and thereby protects the tunnel diode 7 by restricting current flow in the reverse direction. The result is a negligible reverse current flow, thus protecting the tunnel diode from reverse bias thermal failure.

It should be noted that oscillator 1 of FIGURE 2 will similarly provide intervals of oscillation when an alternating-current voltage is supplied to terminals 11 and 12, but the arrangement of FIGURE 3, wherein diode 15 is provided, lessens the likelihood that the circuit components, particularly tunnel diode 7, will be overheated and thereby damaged by reverse current. It will be apparent that a diode could be used to similar advantage in the circuit of FIGURE 2 when an alternating-current voltage source is employed. Use of A.C. bias or half-wave rectified A.C. bias for either circuits of FIGURES 2 or 3 results in the tunnel diode oscillator operating only during a portion of the positive half-cycle. This yields amplitude modulated periods of oscillation at the A.C. voltage supply frequency. The circuits of FIGS. 2 and 3, when designed according to the above, will oscillate at the parallel tuned circuit frequency when the tunnel diode is biased in its negative conductance region. With presently available germanium tunnel diodes this region is from approximately 60 to 350 millivolts positive bias across the tunnel diode. The tunnel diode simply draws current in the reverse direction with negative bias across it. The amplitude of the tuned circuit oscillation voltage depends upon the amplitude or value of the source voltage when the tunnel diode is biased in the negative conductance region.

By way of more clearly explaining the temperature-dependent output signal frequency which may be obtained from circuits such as shown in FIGURES 2 and 3, a specific oscillator circuit connected as shown in FIGURE 2 will be described. The oscillator comprises the following components:

Resistor 6 _____ 100 ohms.
Tunnel diode 7 _. GE type TD-2.
Capacitor 9 _____ GE "Lectrofilm B" (Mylar), .01 mfd.
Inductor 10 ____ 2 microhenrys.

From this list of components, it is immediately apparent that the entire oscillator can be housed in a very small package by use of microelectronic techniques. The temperature-dependent reactance is to be disposed close to the surface which contacts the conductor or is fully exposed at this surface to allow direct measurement of the conductor surface temperature, preferably being located within the conductor strands to allow direct measure of internal conductor temperature.

An oscillator constructed with the above-mentioned components was found to oscillate at a nominal frequency in the range of 1.1 mc. When the input voltage to terminals 11 and 12, as shown in FIGURE 2, forward D.C. biased for diode 7 with a voltage in the range between 80–110 millivolts, the frequency deviation of the oscillator was less than one kilocycle (0.1%) over this range of input voltages.

In order to more closely examine the changes in output frequency as a function of temperature, reference may be had to FIGURE 4 where a graph is shown illustrating frequency change in kilocycles/second on ordinate 18 and temperature in degrees C. along abscissa 19. The characteristic curve 20 illustrates the frequency change which may be expected from room temperature to 80° C. by utilizing the above-mentioned components in a circuit like that of FIGURE 2. This circuit design may be operated at temperatures on the order of 120° C.

It can be seen from FIGURE 4 that the change in output frequency is substantial as the temperature-dependent reactance, in this example capacitor 9, varies in temperature. Capacitor 9 can be selected from any number of available temperature-variable capacitors in order to provide a curve 18 of either lesser or greater slope. Alternatively, inductor 10 may be selected to have a temperature-dependent reactance. Also, a resonant circuit 8 may be utilized wherein both capacitor 9 and inductor 10 vary with temperature in order to achieve a particular desired resultant temperature-dependent output signal frequency. The specific capacitor selected for purposes of this design has a stable repeatable temperature characteristic with a relatively large positive temperature coefficient. In addition, the consistency of characteristics from one capacitor to another is excellent. As indicated in FIGURE 4, the temperature change from 25 to 80° C. resulted in an overall frequency change of 30 kilocycles.

Turning now to means for mounting the oscillator within the electromagnetic apparatus and means for powering the oscillator, reference may be had to FIGURE 5, which is a cutaway view of a portion of a conductor within an electromagnetic apparatus, specifically a generator where it is desired to monitor the conductor bar temperature. A current-carrying conductor 21 is shown which normally is constituted of strands of conductive material such as copper or aluminum. A thick insulating sheath of "ground insulation" 22 surrounds conductor 21 and electrically insulates conductor 21 from other portions of the apparatus.

In accordance with the invention, an oscillator 23 is placed immediately adjacent conductor 21. Oscillator 23 may be "encapsulated" or provided with a sheath of suitable material such as silicone-rubber. In such case, the temperature-dependent reactance is near or in the surface which is in proximate relationship to conductor 21 (not shown). Oscillator 23 may have a circuit such as shown in FIGURES 2 or 3.

A filler strip 24 is provided of cross-sectional dimension similar to that of oscillator 23. By this means, it is possible to avoid discontinuities which may tend to disrupt the insulating properties of sheath 22. In many large electromagnetic devices, such filler strips are normally utilized. In such apparatus, the only requirement is that a portion of the filler strip be cut away to admit oscillator 23. Sheath 22 serves to secure the oscillator 23 to the conductor 21.

Input terminals 25 and 26 of oscillator 23 are analogous to terminals 11 and 12 of FIGURE 2 or terminals 16 and 17 of FIGURE 3. In order to provide a suitable source of voltage, terminals 25 and 26 are shown connected to longitudinally spaced points along conductor 21. Since the conductor 21 will normally be carrying a heavy current, and since conductor 21 has a finite resistance, there will be a significant difference of potential developed between terminals 25 and 26. The character of this voltage will, of course, depend upon the current flow through conductor 21. That is, with a direct-current flow through conductor 21, there will be a direct-current voltage drop; and with an alternating current flow in conductor 21, there will correspondingly be an alternating-current voltage drop. As discussed before in conjunction with the circuit of FIGURE 3, either A.C. or D.C. is appropriate to properly supply oscillator 23. A miniature battery (not shown) incorporated as an integral part of oscillator 23 may, of course, be used as a D.C. voltage source.

In the embodiment of FIGURE 6, the mounting of oscillator 23 is similar to that described in FIGURE 5, but the means for energizing the oscillator is different. In FIGURE 6, terminals 25 and 26 are connected to a coil 27 having a number of turns. In this case, the voltage supplied to terminals 25 and 26 results from the voltage induced in coil 27 as a result of a changing magnetic flux therethrough. It will be apparent that use of this embodiment is limited to apparatus wherein there is a varying electromagnetic flux in the vicinity of the conductors. In the case of alternating-current apparatus, this requirement is easily met, and it is frequently possible to use armature cross-flux in direct-current machines to provide the desired varying field. In addition, it is possible in many applications to place coil 27 in a varying magnetic field which saturates, thereby providing a relatively constant maximum supply voltage to terminals 25 and 26.

In FIGURE 7 is shown an oscillator 23 disposed within an insulating sheath 22 which surrounds a conductor (not shown). The signal pickup device comprises a suitable antenna termination, one such device comprising antenna loop 28, inner conductor 29, and a grounded shield 30. Loop 28 is disposed externally of sheath 22 and in proximity to oscillator 23. By utilizing auxiliary pickup means such as shown in FIGURE 7, it is possible to provide a more selective and a greater signal strength to the monitoring means such as a receiver 5 of FIGURE 1. This will ordinarily reduce the cost of the monitoring means, since less amplification is required. However, a sufficient signal may be induced into and conducted along the conductors of the apparatus to be received externally at the machine terminals, or may be propagated along the interface formed between the sheath and conductor to enable reception at the end windings of the apparatus with a monitor no more sensitive than an ordinary radio receiver. The extent to which one of various modes of propagation dominates is dependent upon the nominal frequency of oscillation, signal strength, and geometry involved.

There has been shown and described herein a temperature sensor system which is capable of providing a measurement of the actual conductor temperature in electromagnetic apparatus at precise locations. The actual conductor temperature is sensed and it is not necessary that the conductor ground insulation be punctured. While the preferred embodiments of this invention have been disclosed, many modifications and variations will occur to those skilled in the art. Therefore, it is intended that the scope of the subject invention be defined solely by the following claims.

What I claim as new and desire to secure by Letters Patent of the United States is:

1. In electrical apparatus, the combination of:
   (a) a current-carrying conductor;
   (b) an insulating sheath surrounding the conductor;
   (c) electronic oscillator means having a temperature-dependent output signal;
   (d) means supporting the oscillator within the sheath and in direct heat exchange relationship with the conductor;
   (e) means energizing the oscillator including a pair of voltage taps spaced along the conductor and electrically connected thereto at locations of different potential; and
   (f) means remote from the oscillator for monitoring the output signal of the oscillator to provide a measurement of the conductor.

2. In electromagnetic apparatus subject to temperature change in operation, the combination of:
   (a) a current-carrying conductor;
   (b) an insulating sheath surrounding the conductor;
   (c) electronic oscillator means having a temperature-dependent output signal;
   (d) means supporting the oscillator in direct heat exchange relationship with the conductor;
   (e) means energizing the oscillator and comprising a coil disposed in a field of varying magnetic flux within said apparatus; and
   (f) means remote from the oscillator for monitoring the output signal of the oscillator to provide a measurement of the temperature of the conductor.

3. In electrical apparatus, the combination of:
   (a) a current-carrying conductor subject to temperature change in operation;
   (b) oscillator means comprising a network including a resistor, a negative resistance diode and a frequency-determining parallel resonant circuit;
   (c) at least one element in the parallel resonant circuit having a temperature-dependent reactance whereby the natural resonant frequency of the circuit changes with variations in temperature;
   (d) means supporting said network in a position adjacent the conductor, whereby said element is in good heat exchange relationship with the conductor;
   (e) energizing means connected to the oscillator means for supplying power thereto comprising two voltage taps longitudinally spaced along the current-carrying conductor, the taps being connected to respective input terminals of the said network; and
   (f) means remote from the oscillator for measuring the frequency of oscillation of the oscillator means to provide an indication of the temperature of said conductor.

4. In electrical apparatus, the combination of:
   (a) a current-carrying conductor subject to temperature change in operation;
   (b) oscillator means comprising a network including a resistor, a negative resistance diode and a frequency-determining parallel resonant circuit;
   (c) at least one element in the parallel resonant circuit having a temperature-dependent reactance whereby the natural resonant frequency of the circuit changes with variations in temperature;
   (d) means supporting said network in a position adjacent the conductor, whereby said element is in good heat exchange relationship with the conductor;
   (e) energizing means connected to the oscillator means for supplying power thereto comprising a coil disposed in a field of varying magnetic flux within said apparatus, the opposite extremities of the coil being connected respectively to input terminals of the said network; and
   (f) means remote from the oscillator for measuring the frequency of oscillation of the oscillator means to provide an indication of the temperature of said conductor.

References Cited by the Examiner

UNITED STATES PATENTS

| | | | |
|---|---|---|---|
| 1,917,129 | 7/1933 | Kirch | 73—343 |
| 2,575,922 | 11/1951 | Langenwalter | 73—351 |
| 2,834,920 | 5/1958 | Lennox et al. | 73—350 X |
| 3,134,949 | 5/1964 | Tiemann | 331—107 X |
| 3,158,027 | 11/1964 | Kibler | 73—362 |
| 3,174,341 | 3/1965 | Takuru Sudo et al. | 73—351 |

LOUIS R. PRINCE, *Primary Examiner.*

DAVID SCHONBERG, *Examiner.*

S. H. BAZERMAN, *Assistant Examiner.*